United States Patent Office 2,981,739
Patented Apr. 25, 1961

2,981,739

CERTAIN ALPHA-HALOALDEHYDE ADDITION PRODUCTS OF ETHYLENETHIOUREAS AND PROCESS

Russell M. Bimber, Painesville, Ohio, assignor to Diamond Alkali Company, Cleveland, Ohio, a corporation of Delaware No Drawing. Filed Jan. 27, 1958, Ser. No. 711,130

9 Claims. (Cl. 260—309.6)

This invention relates to the reaction of a substituted ethylenethiourea with an alpha halo aldehyde and to the reaction products and applications thereof.

The term "substituted ethylenethiourea" as employed in the specification and claims is intended to refer broadly to a compound represented by the structure:

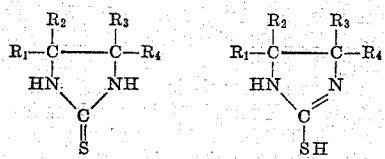

wherein $R_1$, $R_2$, $R_3$, and $R_4$ are selected from the group consisting of hydrogen atoms, alkyl radicals, such as methyl, ethyl, propyl, butyl, octyl, their isomers and the like, especially lower alkyl radicals; aryl radicals, such as phenyl radicals and naphthyl radicals; thienyl radicals; e.g.,—$C_4H_3S$; aralkyl radicals, such as benzyl and phenethyl radicals; alkaryl radicals, such as tolyl and xylyl radicals; and substituted derivatives of these radicals, especially corresponding halogen-substituted group, i.e., chlorine, fluorine, bromine, and iodine substituted derivatives, each of which radicals preferably contains no more than 16 carbon atoms.

The expression "alpha halo aldehyde" as used in the specification and claims is intended to refer broadly to a compound of the structure:

RCHO wherein R is an alpha-halogen-substituted alkyl radical, especially a halogen-substituted lower alkyl radical, as previously defined. Exemplary alpha halo aldehydes are 2,2,3 - trichloropropionaldehyde; 2,2,3 - tribromopropionaldehyde; 2,2,3-trichlorobutraldehyde; 2,3-dichlorobutraldehyde; 2,2,3,3-tetrachlorobutyraldehyde; and 2,2,3-trifluorobutraldehyde; specifically preferred alpha halo aldehydes being alpha halo acetaldehydes, such as chloral; 2,2 - dichloroacetaldehyde; 2,2,2 - tribromoacetaldehyde; 2,2-dichloro-2-bromoacetaldehyde. It is also intended that the above alpha halo aldehydes and specifically the alpha halo acetaldehydes should include their respective hydrates, e.g., chloral hydrate, the hydrate of 2,2,2-trichlorobutraldehyde, and the hydrate of 2,2-dichloroacetaldehyde.

The compounds of this invention have the following structure:

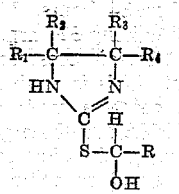

wherein $R_1$, $R_2$, $R_3$ and $R_4$ are selected from the group consisting of hydrogen, lower alkyl, phenyl, naphthyl, thienyl, benzyl, phenethyl, tolyl, xylyl and corresponding halogen-substituted groups; and R is a halogen-substituted lower alkyl radical.

The term "1:1 addition product" as employed in the specification and claims is intended to refer to the chemical reaction product formed by the stoichiometric combination of 1 molecule of one reactant with 1 molecule of another, e.g., the 1:1 addition product of ethylenethiourea and an alpha halo aldehyde being the combination of 1 molecule of ethylenethiourea with 1 molecule of an alpha halo aldehyde.

More specifically, the present invention relates to the 1:1 addition product of ethylenethiourea and an alpha halo aldehyde, especially an alpha halo acetaldehyde, preferably chloral or chloral hydrate, through which reaction a halohydroxy alkyl radical, e.g., such as 2,2,2-trichloro - 1 - hydroxyethyl, 2,2,3 - trichloro - 1 - hydroxypropyl, 2,2,2 - tribromo - 1 - hydroxyethyl, 2-chloro - 1 - hydroxypropyl, and 2 - chloro - 1 - hydroxyethyl, 2,2,3 - tribromo - 1 - hydroxypropyl; 2,2,3 - trichloro - 1 - hydroxybutyl; 2, 3 - dichloro - 1 - hydroxybutyl; 2,2,3,3 - tetrachloro - 1 - hydroxybutyl; 2,2,3 - trifluoro - 1 - hydroxybutyl; 2,2 - dichloro - 1 - hydroxyethyl; and 2 - bromo - 2,2 - dichloro - 1 - hydroxyethyl.

Specifically, the 1:1 addition product of ethylenethiourea and chloral melts at 161°–163° C. and, based on the analytical procedure disclosed by Edens and Johnson, Journal of American Chemical Society, vol. 63, (1941), p. 3527, is represented by the structure:

(I)
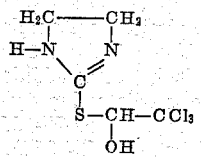

Based on the above reference, a compound having the structure (II)
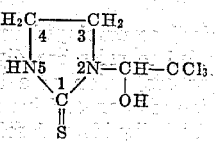

would be expected to give a white gel when mixed with a solution of copper sulfate and hydrochloric acid, whereas a compound of the structure (I) would not. The product (I) i.e., 2-(2,2,2-trichloro-1-hydroxyethylthio)-2-imidazoline, of the reaction of chloral and ethylenethiourea given above does not give such a gel whereas ethylenethiourea alone does.

Specific reactions falling within the scope of this invention are listed in Table I in which compounds in column 1 may be reacted with compounds in column 2.

TABLE I

| Substituted Ethylenethiourea | Alpha Halo Aldehyde |
|---|---|
| 3 methyl-ethylenethiourea | $Cl_3C—CHO$. |
| 3 ethyl-ethylenethiourea | $Cl_2CH—CHO$. |
| ethylenethiourea | $CH_3CH_2CHCl—CCl_2—CHO$. |
| 3,3-dimethyl-ethylenethiourea | $CH_2Cl—CHCl—CHO$. |
| 3,4-diethyl-ethylenethiourea | |

In certain instances, the above reactions may be more easily effected by bringing the two reactants together in the presence of a solvent such as water or an organic liquid, e.g., benzene, chloroform, heptane, trichlorobenzene, or the like. Typically the reactions are exothermic and are desirably carried out at a temperature within the range from about 0° to 150° C., preferably below the reflux temperature of the aldehyde, e.g., using chloral below about 97° C. In general, it is preferred to employ substantially stoichiometric ratios of the reactants, however, considerable departure from these ratios can be tolerated in many instances without serious detriment to either yields or quality of product. The reaction is preferably carried to completion which generally requires not more than about 2 hours, e.g., 1–2 hours at 90° C.

The compounds of this invention are useful in the fields of pharmaceuticals, chemical intermediates, and also show biological activity, such as the control of microorganism growth, e.g., protection of tomato foliage against blight fungi, the prevention of undesirable plant growth, the control of insect growth, i.e., the control of aphid growth.

While compounds of this invention may be employed in a variety of applications, biological or otherwise, it will be understood, of course, that these compounds may be utilized in diverse formulations, both liquid and solid, including finely-divided powders and granular materials, as well as liquids, such as salt solutions, concentrates, emulsifiable concentrates, slurries and the like, depending upon the application intended and the formulation media desired.

Thus, it will be appreciated that compounds of this invention may be employed to form biologically active substances containing such compounds as essential active ingredients thereof, which compositions may also include finely-divided dry or liquid diluents, extenders, fillers, conditioners, including various clays, diatomaceous earth, talc, spent catalyst, alumina-silica materials and incorporating liquids, solvents, etc., typically water and various organic liquids such as kerosene, benzene, toluene and other petroleum distillate fractions or mixtures thereof.

When liquid formulations are employed, or dry materials prepared which are to be used in liquid form, it is desirable in certain instances additionally to employ a wetting, emulsifying, or dispersing agent to facilitate use of the formulation, e.g., Triton X-155 (alkyl aryl polyether alcohol, U.S. Patent 2,504,064). Suitable surface active agents are set forth in an article by McCutcheon in "Soap and Chemical Specialities," vol. 31, Nos. 7–10 (1955).

The term "carrier" as employed in the specification and claims is intended to refer broadly to the materials constituting a major proportion of a biologically active material or other formulation and hence includes finely-divided materials, both liquids and solids, as aforementioned, conventionally used in such applications.

In order that those skilled in the art may more completely understand the present invention and the preferred metthods by which the same may be carried into effect, the following specific examples are offered.

*Example I*

40.8 g. (0.4 mol) ethylenethiourea and 135.0 g. (0.8 mol) chloral hydrate are dissolved in 400 ml. of $H_2O$ containing 4.0 mol. concentrated HCl. The clear solution is filtered and heated in a boiling water bath for 1 hour and 45 minutes after which it is allowed to cool. Upon cooling, filtering, washing several times with distilled water, and drying at 50° C. a product consisting of white flakes is obtained. This product melts at 161°–163° C. with decomposition above this range. Preparation of the desired reaction product, $C_5H_7Cl_3N_2OS$, is indicated through the following elemental analytical data:

| Element | Actual Percent by Wt. | Calculated Percent by Wt. |
|---|---|---|
| C | 24.19 | 24.10 |
| H | 3.03 | 2.84 |
| Cl | 43.3 | 42.7 |

*Example II*

Insecticidal activity is shown in using the bean aphid, *Aphis fabae*, which is cultured on nasturtium plants. Nasturtium plants are infested with approximately 100 aphids at the time of treatment. The test plants are treated separately by pouring formulations (2000 p.p.m. product of Example I, 5% acetone, 0.01% Triton X-155, balance water) on the soil at rates equivalent to 64 lbs./acre and 32 lbs./acre. Mortality observations 24 hours after treatment show 97% and 69% mortality at 64 and 32 lbs./acre, respectively.

*Example III*

To evaluate insecticidal activity, a test is carried out wherein adult two-spotted spider mites, *Tetranychus bimaculatus*, maintained on Tendergreen beans under controlled conditions are transferred from a stock culture by leaf cuttings to uninfested seed leaves of bean plants in 2½ inch pots the day prior to testing. A formulation of the product of Example I (2000 p.p.m. product of Example I, 5% acetone, 0.01% Triton X-155, the balance water) is sprayed onto the infested test plants. Mortality counts are made after two days showing better than 55% mortality.

*Example IV*

A tomato foilage disease test is conducted measuring the ability of the test compound to protect tomato foilage against infection by the early blight fungus, *Alternaria solani*. Tomato plants 5 to 7 inches high of the variety Bonny Best are employed. The plants are sprayed with 100 ml. test formulation (2000 p.p.m. and 400 p.p.m. product of Example I in combination with 5% acetone, 0.01% Triton X-155, and the balance water) at 40 lbs. air pressure while being rotated on a turntable in a spray chamber. After the spray deposit is dry, the treated plants, and comparable untreated controls, are sprayed with approximately 20 ml. of a spore suspension containing about 20,000 conidia of *A. solani* per ml. The plants are held in a saturated atmosphere for 24 hours at 70° F. to permit spore germination and infection. After 2 to 4 days, lesion counts are made on the three uppermost fully expanded leaves. Data based on the number of lesions obtained on the control plants shows significant disease control.

*Example V*

To evaluate herbicidal activity, seeds of perennial rye grass are treated in Petri dishes with aqueous suspensions of the product of Example I at 1000 and 100 p.p.m. (1000 or 100 p.p.m. product of Example I, 5% acetone, 0.01% Triton X-155, the balance water). Lots of 25 seeds are scattered in separate dishes containing filter paper discs moistened with 5 ml. of the test formulation at each concentration. After 7 to 10 days under controlled conditions, the test compound is given a rating which corresponds to the concentration that inhibits germination of half the seeds of the test crop. Employing this procedure, results indicate a concentration of about 100–1000 p.p.m. inhibit seed germination.

*Example VI*

Further to evaluate the effect of the product of Example I upon the germination of seeds in soil, a mixture of seeds of six crop plants is broadcast in 8" x 8" x 2" metal cake pans filled to within one half inch of the top with composted greenhouse soil. The seed is uniformly covered with about one-quarter inch soil and then watered. After 24 hours, 80 ml. of an aqueous test formulation containing 320 mg. product of Example I is sprayed at 10 lbs. air pressure uniformly over the surface of the pan. This is equivalent to 64 lbs./acre. The seed mixture contains seeds of three broadleafs: turnip, flax, and alfalfa, and three grasses: wheat, millet, and rye grass. Two weeks after treatment, records are taken on seedling stand as compared to the controls. Using this procedure, results show 60% stand of the broadleaf and 20% stand of the grasses. The grasses however are severly stunted and receive phytotoxicity rating of 9 based on a scale from 0 for no injury to 11 for plant kill.

It is to be understood that although the invention has been described with specific reference to particular embodiments thereof, it is not to be so limited, since changes and alterations therein may be made which are within the full intended scope of this invention as defined by the appended claims.

What is claimed is:

1. The method which comprises chemically reacting ethylenethiourea and chloral.

2. The method which comprises chemically reacting ethylenethiourea and chloral hydrate.

3. The method which comprises chemically reacting 1 molecule of ethylenethiourea with 1 molecule of chloral yielding a product melting at 161°–163° C.

4. The method which comprises chemically reacting 1 molecule of ethylenethiourea with 1 molecule of chloral hydrate.

5. The method which comprises chemically reacting 1 molecule of ethylenethiourea with 1 molecule of chloral yielding a product melting at 161°–163° C. wherein the reaction is carried out in the presence of water from 0 to 150° C.

6. The method which comprises chemically reacting 1 molecule of ethylenethiourea with 1 molecule of chloral hydrate wherein the reaction is carried out in the presence of water below 150° C.

7. A compound having the structure

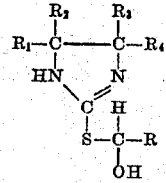

wherein $R_1$, $R_2$, $R_3$ and $R_4$ are selected from the group consisting of hydrogen, lower alkyl, phenyl, naphthyl, thienyl, benzyl, phenethyl, tolyl, xylyl and corresponding halogen-substituted groups; and R is a halogen-substituted lower alkyl, said

group being derived from an alpha halo aldehyde.

8. The compound 2-(2,2,2-trichloro-1-hydroxyethylthio)-2-imidazoline.

9. The method which comprises chemically combining an ethylenethiourea having the structure

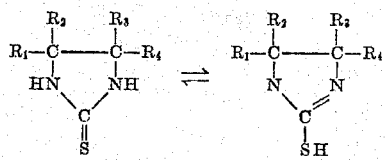

wherein $R_1$, $R_2$, $R_3$ and $R_4$ are selected from the group consisting of hydrogen, lower alkyl, phenyl, naphthyl, thienyl, benzyl, phenethyl, tolyl, xylyl and corresponding halogen-substituted groups; with an alpha halo aldehyde having the structure RCHO, wherein R is an alpha halogen-substituted lower alkyl radical, to produce a product having the structure

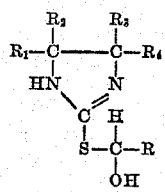

wherein $R_1$, $R_2$, $R_3$ and $R_4$ are selected from the group consisting of hydrogen, lower alkyl, phenyl, naphthyl, thienyl, benzyl, phenethyl, tolyl, xylyl and corresponding halogen-substituted groups; and R is a halogen-substituted lower alkyl radical.

References Cited in the file of this patent

UNITED STATES PATENTS

| | | |
|---|---|---|
| 2,353,997 | Cooper | July 18, 1944 |
| 2,357,149 | Kamp | Aug. 29, 1944 |
| 2,621,211 | Behnisch | Dec. 9, 1952 |
| 2,635,115 | Bernstein | Apr. 14, 1953 |
| 2,726,150 | Wolter | Dec. 6, 1955 |
| 2,764,478 | Searle | Sept. 25, 1956 |
| 2,774,706 | Hackmann | Dec. 18, 1956 |
| 2,801,200 | Hackmann | July 30, 1957 |